United States Patent
Chin

(10) Patent No.: US 10,635,226 B2
(45) Date of Patent: Apr. 28, 2020

(54) IMAGE FORMING APPARATUS THAT ADJUSTS AN ANGLE OF AN OPERATION PANEL

(71) Applicant: KYOCERA Document Solutions Inc., Osaka (JP)

(72) Inventor: Bunhaku Chin, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 9 days.

(21) Appl. No.: 15/939,524

(22) Filed: Mar. 29, 2018

(65) Prior Publication Data

US 2018/0284940 A1  Oct. 4, 2018

(30) Foreign Application Priority Data

Mar. 29, 2017  (JP) ................................ 2017-064641

(51) Int. Cl.
| | |
|---|---|
| *G06F 3/044* | (2006.01) |
| *G06F 3/041* | (2006.01) |
| *G03G 15/00* | (2006.01) |
| *G06F 3/12* | (2006.01) |
| *H04N 1/00* | (2006.01) |

(52) U.S. Cl.
CPC ....... *G06F 3/0416* (2013.01); *G03G 15/5016* (2013.01); *G06F 3/1204* (2013.01); *G06F 3/1253* (2013.01); *G06F 2203/04105* (2013.01); *H04N 1/00411* (2013.01)

(58) Field of Classification Search
CPC ........ G06F 3/0484–0486; G06F 3/0202–0224; G06F 3/04847
See application file for complete search history.

(56) References Cited

U.S. PATENT DOCUMENTS

| | | | |
|---|---|---|---|
| 8,223,129 B2 | 7/2012 | Touyamasaki | |
| 8,243,042 B2 | 8/2012 | Touyamasaki | |
| 2005/0185216 A1* | 8/2005 | Mitsuhashi | ........ H04N 1/00496 358/1.15 |
| 2008/0259048 A1 | 10/2008 | Touyamasaki | |
| 2012/0044169 A1* | 2/2012 | Enami | ..................... G06F 3/041 345/173 |
| 2012/0176334 A1 | 7/2012 | Touyamasaki | |

(Continued)

FOREIGN PATENT DOCUMENTS

| | | |
|---|---|---|
| JP | 2005-128039 A | 5/2005 |
| JP | 2008271013 A | 11/2008 |
| JP | 2015102800 A | 6/2015 |

OTHER PUBLICATIONS

An Office Action mailed by the Japanese Patent Office dated Aug. 20, 2019, which corresponds to Japanese Patent Application No. 2017-064641 and is related to U.S. Appl. No. 15/939,524; with English translation.

*Primary Examiner* — Sanghyuk Park
(74) *Attorney, Agent, or Firm* — Studebaker & Brackett PC

(57) ABSTRACT

An image forming apparatus includes a touch panel, an adjuster, a detection section, and an adjustment instruction section. The adjuster adjusts a condition of disposition of the touch panel. The detection section detects a state in which a user makes contact with the touch panel. The adjustment instruction section instructs the adjuster to adjust the condition of the touch panel based on a detection result of the detection section. The condition includes at least one of a position and an attitude.

3 Claims, 8 Drawing Sheets

(56) References Cited

U.S. PATENT DOCUMENTS

2012/0182243 A1    7/2012  Touyamasaki
2015/0145820 A1*   5/2015  Huang ................... G06F 3/044
                                                            345/174
2017/0228674 A1*   8/2017  Budde ................ G06Q 10/0635

* cited by examiner

IMAGE FORMING APPARATUS THAT ADJUSTS AN ANGLE OF AN OPERATION PANEL

INCORPORATION BY REFERENCE

The present application claims priority under 35 U.S.C. § 119 to Japanese Patent Application No. 2017-064641, filed on Mar. 29, 2017. The contents of this application are incorporated herein by reference in their entirety.

BACKGROUND

The present disclosure relates to an image forming apparatus.

An image forming apparatus adjusts the angle of an operation panel. Specifically, the image forming apparatus acquires user information from a wireless terminal and adjusts the angle of the operation panel based on the acquired user information. The user information includes height, age, indication of the existence of a disability and a type thereof, user ID, and name information.

SUMMARY

An image forming apparatus according to the present disclosure includes a touch panel, an adjuster, a detection section, and an adjustment instruction section. The adjuster adjusts a condition of disposition of the touch panel. The detection section detects a state in which a user makes contact with the touch panel. The adjustment instruction section instructs the adjuster to adjust the condition of the touch panel based on a detection result of the detection section. The condition includes at least one of a position and an attitude.

BRIEF DESCRIPTION OF THE DRAWINGS

FIG. 8A is a diagram illustrating an example of the touch panel in a state in which an inclining angle is small.

FIG. 8B is a diagram illustrating an example of the touch panel in a state in which the inclining angle is large.

DETAILED DESCRIPTION

An embodiment of the present disclosure will be described as follows with reference to the drawings (FIGS. 1 to 8B). Note that the elements within the drawings that are the same or equivalent will be referred to with the same reference numbers and descriptions thereof will not be repeated.

Figure 1:
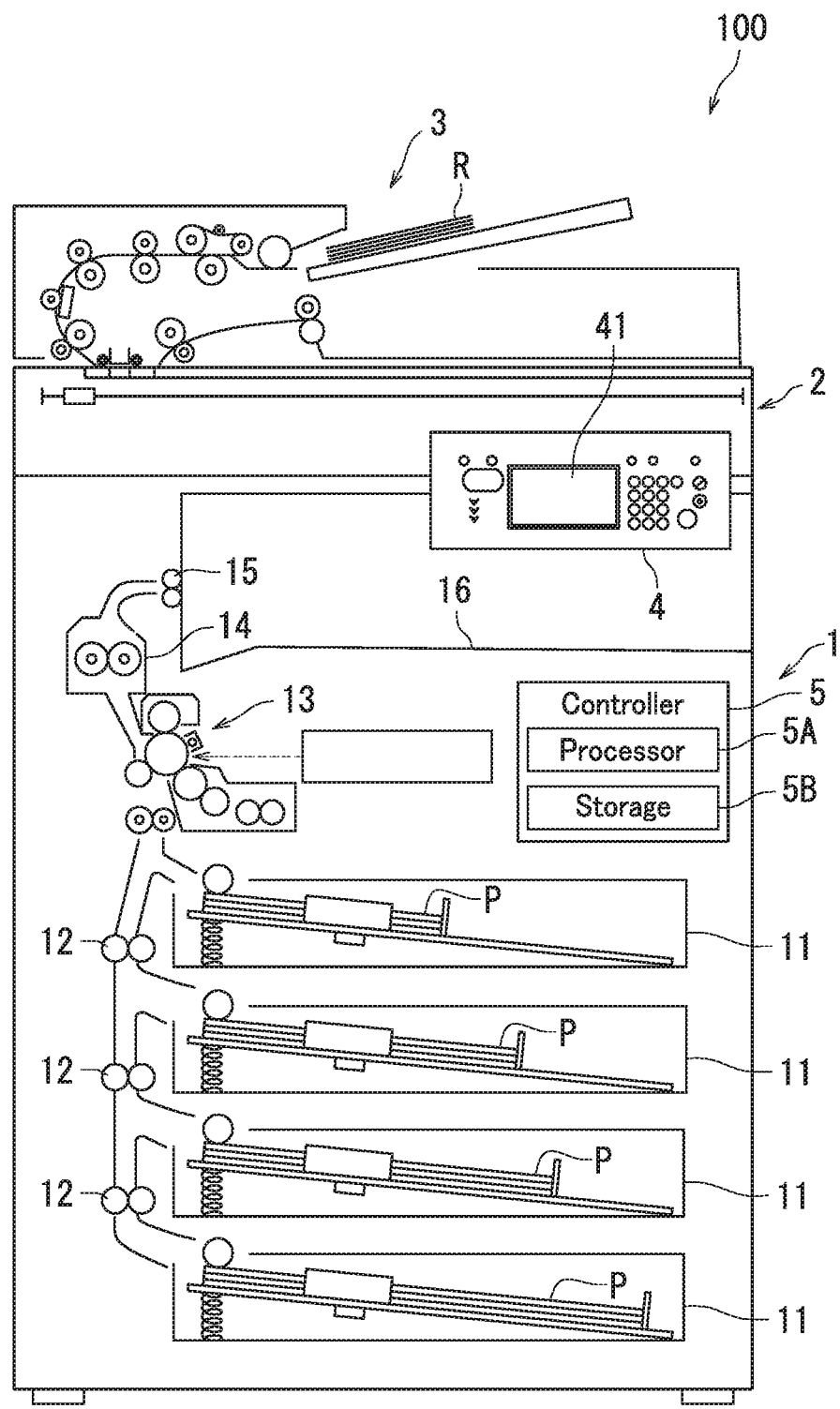
FIG. 1 is a diagram illustrating a configuration of an image forming apparatus according to an embodiment of the present disclosure.

First, an image forming apparatus 100 according to the present embodiment will be described with reference to FIG. 1. FIG. 1 is a diagram illustrating a configuration of the image forming apparatus 100. As illustrated in FIG. 1, the image forming apparatus 100 is a multifunction peripheral. The image forming apparatus 100 includes an image forming unit 1, an image reading unit 2, a document conveying unit 3, an operation display section 4, and a controller 5.

The image forming unit 1 forms an image on paper P (a recording medium). The image reading unit 2 reads an image formed on an original document R, and generates a read image. The document conveying unit 3 feeds the original document R to the image reading unit 2.

The image forming unit 1 also includes paper feed cassettes 11, conveyance roller pairs 12, an image forming section 13, a fixing section 14, an ejection roller pair 15, and an exit tray 16. The paper P fed from the paper feed cassettes 11 is conveyed to the image forming section 13 by the conveyance roller pairs 12.

The image forming section 13 forms an image on the paper P. Specifically, the image forming section 13 includes a photosensitive drum, a charger, an exposure section, a development section, a transfer section, a cleaning section, and a static eliminating section. The image is formed on the paper P by the photosensitive drum, the charger, the exposure section, the development section, and the transfer section.

The paper P with the image formed thereon is conveyed to the fixing section 14. The fixing section 14 fixes the image formed on the paper P to the paper P by applying heat and pressure to the paper P. The paper P with the image fixed thereto is ejected to the exit tray 16 by the ejection roller pair 15.

The operation display section 4 receives operations from a user. The operation display section 4 includes a touch panel 41. The touch panel 41 includes a liquid crystal display (LCD) for example, and displays various images. The touch panel 41 also includes a touch sensor and receives operations from the user. In the present embodiment, the touch sensor (a so-called "force sensor") detects pressing force.

The controller 5 includes a processor 5A and storage 5B. The processor 5A includes a central processing unit (CPU) for example. The storage 5B includes memory such as semi-conductor memory, and may include a hard disk drive (HDD). The storage 5B stores a control program.

Figure 2:
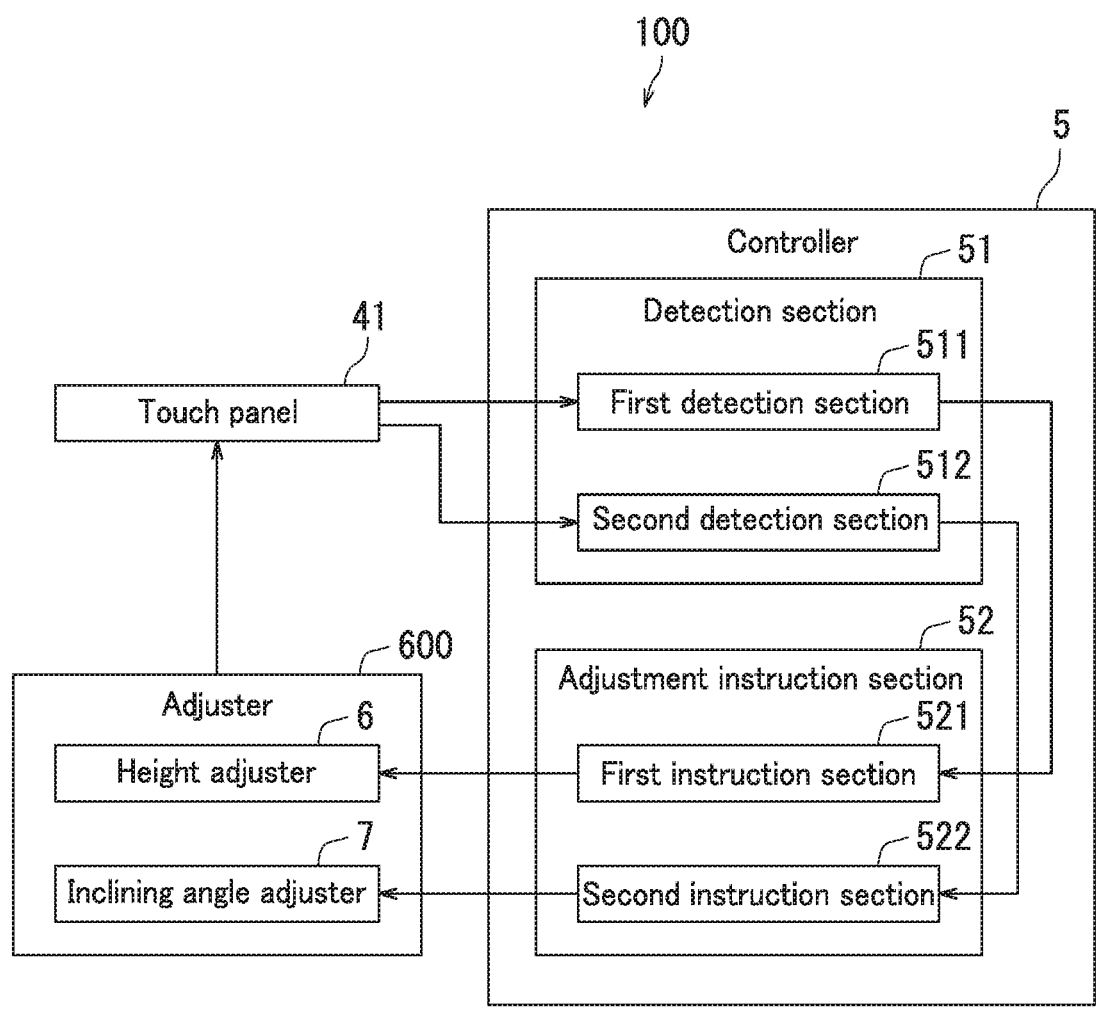
FIG. 2 is a diagram illustrating a configuration of a controller according to the present embodiment.

Next, a configuration of the controller 5 according to the present embodiment will be described with reference to FIGS. 1 and 2. FIG. 2 is a diagram illustrating the configuration of the controller 5. As illustrated in FIG. 2, the controller 5 includes a detection section 51 and an adjustment instruction section 52. Specifically, the processor 5A functions as the detection section 51 and the adjustment instruction section 52 by reading and executing the control program from the storage 5B.

The image forming apparatus 100 further includes an adjuster 600. The adjuster 600 adjusts the condition of disposition of the touch panel 41. "Mode" is meant to include at least one of a position and an attitude. The adjuster 600 also includes a height adjuster 6 and an inclining angle adjuster 7. In the present embodiment, the user maintains a state in which a finger is in contact with the touch panel 41 until the adjuster 600 finishes a process of adjusting the condition of disposition of the touch panel 41.

The height adjuster 6 adjusts a height HT at which the touch panel 41 is disposed according to an instruction of the adjustment instruction section 52. Specifically, the height adjuster 6 increases or decreases the height HT at which the touch panel 41 is disposed according to an instruction of the adjustment instruction section 52.

The inclining angle adjuster 7 adjusts an inclining angle θ at which the touch panel 41 is disposed according to an instruction of the adjustment instruction section 52. The inclining angle θ indicates the inclination of the touch panel 41 with respect to a horizontal plane. Specifically, the inclining angle θ is between the horizontal plane and a display surface of the touch panel 41.

The detection section 51 detects a state in which the user (a finger of the user, for example) is in contact with the touch panel 41. The detection section 51 includes a first detection section 511 and a second detection section 512.

The first detection section 511 detects a total pressure PT in a contact area. The contact area indicates an area in which the user (a finger of the user, for example) makes contact with the touch panel 41. The total pressure PT indicates the product of a surface area ST multiplied by the pressure in the contact area when the pressure applied to the contact area of the touch panel 41 is constant. Specifically, the first detection section 511 detects the total pressure PT by calculating the total of the pressure detected by the touch sensor disposed on the touch panel 41.

The second detection section 512 detects the surface area ST of the contact area.

The adjustment instruction section 52 instructs the adjuster 600 to adjust the condition of the touch panel 41 based on the detection result of the detection section 51. The adjustment instruction section 52 includes a first instruction section 521 and a second instruction section 522.

The first instruction section 521 instructs the height adjuster 6 to adjust the height HT based on the detection result of the first detection section 511.

The second instruction section 522 instructs the inclining angle adjuster 7 to adjust the inclining angle θ based on the detection result of the second detection section 512.

In the present embodiment as described above with reference to FIGS. 1 and 2, the detection section 51 detects a state in which the user (a finger of the user, for example) is in contact with the touch panel 41. The adjustment instruction section 52 then instructs the adjuster 600 to adjust the condition of disposition of the touch panel 41 based on the detection result of the detection section 51. The adjuster 600 adjusts the condition of disposition of the touch panel 41 according to an instruction from the adjustment instruction section 52. Accordingly, the user can adjust the condition of disposition of the touch panel 41 by using a finger, for example, to make contact with the touch panel 41. As a result, the condition of disposition of the touch panel 41 can be adjusted with little effort even when different users use the image forming apparatus.

Figure 3A:
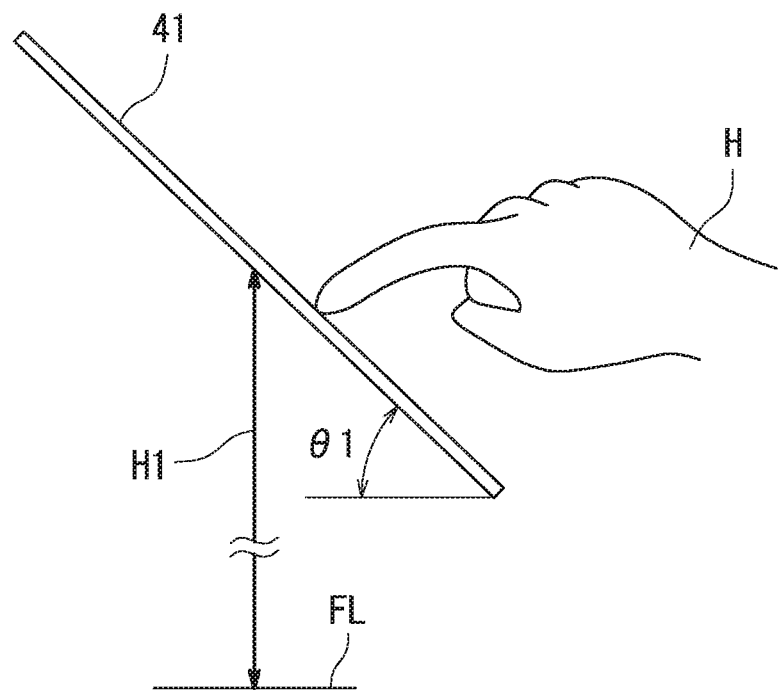
FIG. 3A is a diagram illustrating an example of a touch panel before adjustment.

Next, a process of the first instruction section 521 and the second instruction section 522 will be described with reference to FIGS. 2 to 4B. FIG. 3A is a diagram illustrating an example of the touch panel 41 before adjustment. As illustrated in FIG. 3A, the height HT of the touch panel 41 is a height H1. Note that the height HT indicates the distance from a reference surface FL to a location of the center of the touch panel 41. The reference surface FL indicates a plane serving as a reference. The reference surface FL is the floor surface on which the image forming apparatus 100 is located, for example. Also, the inclining angle θ of the touch panel 41 is an inclining angle θ1 in FIG. 3A.

The height H1 is 90 cm, for example, and is lower than a suitable height HA (110 cm to 130 cm, for example). Also, the inclining angle θ1 is 50°, for example, and is larger than a suitable inclining angle θA (20° to 30°, for example).

In a normal use state, the total pressure PT in the contact area tends to be high when the height HT is high and low when the height HT is low. In the condition illustrated in FIG. 3A, the total pressure PT in the contact area is of a low value as compared to a suitable pressure FA because the height H1 is lower than the suitable height HA. The suitable pressure FA is at least a second pressure PT2 and at most a first pressure PT1, for example. Also in the normal use state, the surface area ST of the contact area tends to be small when the inclining angle θ is large and large when the inclining angle θ is small. In the condition illustrated in FIG. 3A, the surface area ST of the contact area is of a small value as compared to a suitable surface area SA because the inclining angle θ1 is large compared to the suitable inclining angle θA. The suitable surface area SA is at least a second surface area ST2 and at most a first surface area ST1, for example.

The first instruction section 521 instructs the height adjuster 6 to increase the height HT when the total pressure PT is lower than the second pressure PT2. Specifically, the first instruction section 521 instructs the height adjuster 6 to increase the height HT by a second distance ΔH2. The second distance ΔH2 is 5 cm, for example.

The second instruction section 522 instructs the inclining angle adjuster 7 to decrease the inclining angle θ when the surface area ST is smaller than the second surface area ST2. Specifically, the second instruction section 522 instructs the inclining angle adjuster 7 to decrease the inclining angle θ by a second angle Δθ2. The second angle Δθ2 is 5°, for example.

Figure 3B:
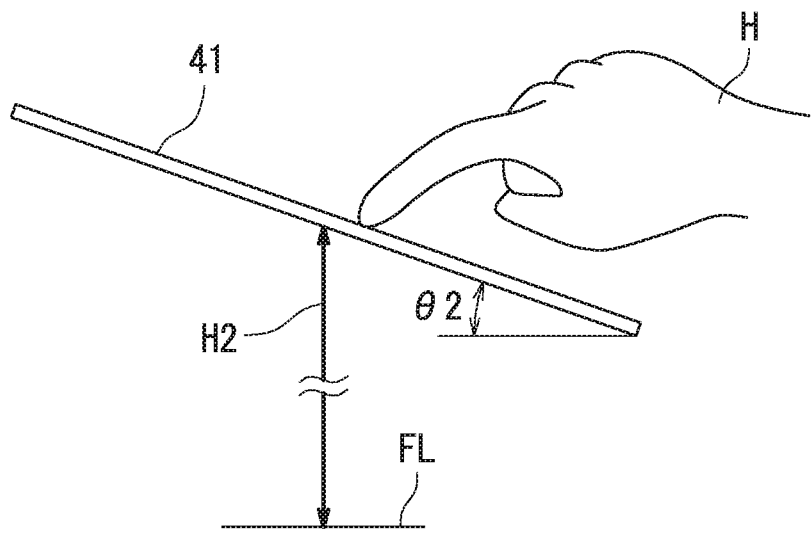
FIG. 3B is a diagram illustrating an example of the touch panel after adjustment.

FIG. 3B is a diagram illustrating an example of the touch panel 41 after adjustment. As illustrated in FIG. 3B, the height HT of the touch panel 41 is the height H2. Also, the inclining angle θ of the touch panel 41 is the inclining angle θ2. The height H2 is 115 cm and the inclining angle θ2 is 30°, for example. As such, the height HT of the touch panel 41 is adjusted to the suitable height HA, and the inclining angle θ of the touch panel 41 is adjusted to the suitable inclining angle θA.

Figure 4A:
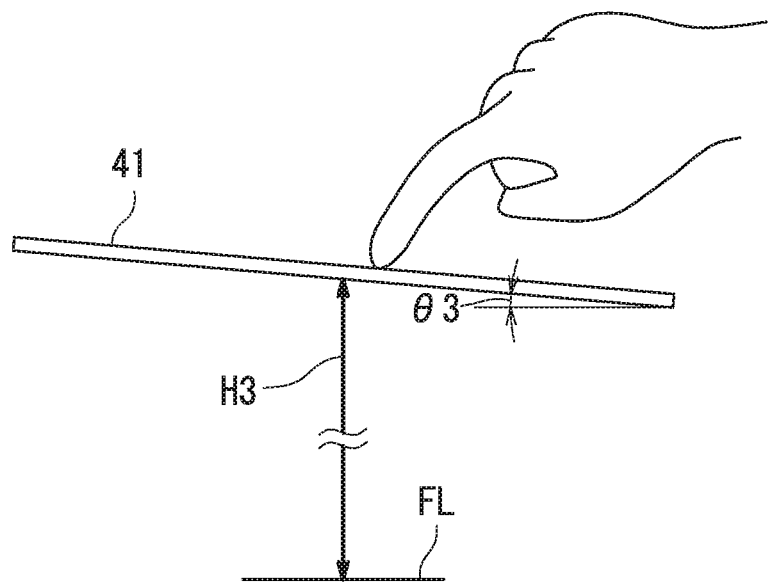
FIG. 4A is a diagram illustrating another example of the panel before adjustment.

FIG. 4A is a diagram illustrating another example of the touch panel 41 before adjustment. As illustrated in FIG. 4A, the height HT of the touch panel 41 is a height H3. Also, the inclining angle θ of the touch panel 41 is an inclining angle θ3.

The height H3 is 150 cm, for example, and higher than the suitable height HA. Also, the inclining angle θ3 is 10°, for example, and is smaller than the suitable inclining angle θA.

In the condition illustrated in FIG. 4A, the total pressure PT in the contact area is of a high value compared to the suitable pressure FA because the height H3 is higher than the suitable height HA. In the condition illustrated in FIG. 4A, the surface area ST of the contact area is also of a large value compared to the suitable surface area SA because the inclining angle θ3 is smaller than the suitable inclining angle θA.

The first instruction section 521 instructs the height adjuster 6 to decrease the height HT when the total pressure PT is higher than the first pressure PT1. Specifically, the first instruction section 521 instructs the height adjuster 6 to decrease the height HT by a first distance ΔH1. The first distance ΔH1 is 5 cm, for example.

The second instruction section 522 instructs the inclining angle adjuster 7 to increase the inclining angle θ when the surface area ST is larger than the first surface area ST1. Specifically, the second instruction section 522 instructs the inclining angle adjuster 7 to increase the inclining angle θ by a first angle Δθ1. The first angle Δθ1 is 5°, for example.

Figure 4B:
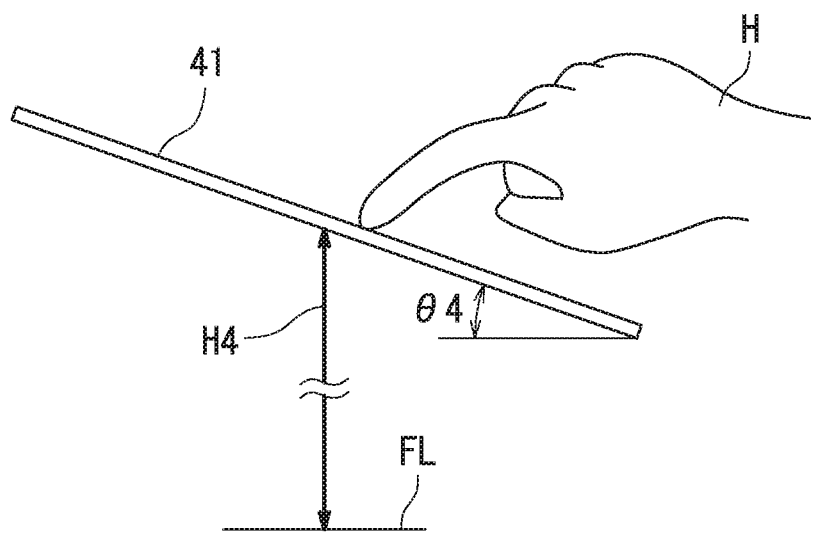
FIG. 4B is a diagram illustrating another example of the touch panel after adjustment.

FIG. 4B is a diagram illustrating another example of the touch panel 41 after adjustment. As illustrated in FIG. 4B, the height HT of the touch panel 41 is a height H4. Also, the inclining angle θ of the touch panel 41 is an inclining angle θ4. The height H4 is 125 cm and the inclining angle θ2 is 25°, for example. As such, the height HT of the touch panel 41 is adjusted to the suitable height HA, and the inclining angle θ of the touch panel 41 is adjusted to the suitable inclining angle θA.

In the present embodiment as described above with reference to FIGS. 2 to 4B, the first detection section 511 detects the total pressure PT in the contact area. The first instruction section 521 instructs the height adjuster 6 to adjust the height HT of the touch panel 41 based on the detection result of the first detection section 511. Note that the total pressure PT is higher than the suitable pressure FA when the height HT of the touch panel 41 is higher than the suitable height HA (refer to FIG. 4A). By contrast, the total pressure PT is lower than the suitable pressure FA when the height HT of the touch panel 41 is lower than the suitable height HA (refer to FIG. 3A). Accordingly, the height HT of the touch panel 41 can be adjusted to the suitable height HA because the first instruction section 521 instructs the height adjuster 6 to adjust the height HT of the touch panel 41 based on the total pressure PT.

The first instruction section 521 also instructs the height adjuster 6 to decrease the height HT of the touch panel 41 when the total pressure PT is higher than the first pressure PT1. By contrast, the first instruction section 521 instructs the height adjuster 6 to increase the height HT of the touch panel 41 when the total pressure PT is lower than the second pressure PT2. Therefore, the first instruction section 521 instructs the height adjuster 6 to adjust the height HT of the touch panel 41 so as to satisfy the following condition. That is, the height adjuster 6 adjusts the height HT of the touch panel 41 so that the total pressure PT is at least the second pressure PT2 and at most the first pressure PT1. Accordingly, the height HT of the touch panel 41 can be adjusted to the more suitable height HA by setting the first pressure PT1 and the second pressure PT2 to suitable values.

Furthermore, the second detection section 512 detects the surface area ST of the contact area. The second instruction section 522 instructs the inclining angle adjuster 7 to adjust the inclining angle θ of the touch panel 41 with respect to the horizontal plane based on the detection result of the second detection section 512. Note that the surface area ST is smaller than the suitable surface area SA when the inclining angle θ of the touch panel 41 is larger than the suitable inclining angle θA (refer to FIG. 3A). By contrast, the surface area ST is larger than the suitable surface area SA when the inclining angle θ of the touch panel 41 is smaller than the suitable inclining angle θA (refer to FIG. 4A). Accordingly, the inclining angle θ of the touch panel 41 can be adjusted to the suitable inclining angle θA because the second instruction section 522 instructs the inclining angle adjuster 7 to adjust the inclining angle θ of the touch panel 41 based on the surface area ST.

Additionally, the second instruction section 522 instructs the inclining angle adjuster 7 to increase the inclining angle θ of the touch panel 41 when the surface area ST is larger than the first surface area ST1. By contrast, the second instruction section 522 instructs the inclining angle adjuster 7 to decrease the inclining angle θ of the touch panel 41 when the surface area ST is smaller than the second surface area ST2. Therefore, the second instruction section 522 instructs the inclining angle adjuster 7 to adjust the inclining angle θ of the touch panel 41 so as to satisfy the following condition. That is, the inclining angle adjuster 7 adjusts the inclining angle θ of the touch panel 41 so that the surface area ST is at least the second surface area ST2 and at most the first surface area ST1. Accordingly, the inclining angle θ of the touch panel 41 can be adjusted to the more suitable inclining angle θA by setting the first surface area ST1 and the second surface area ST2 to suitable values.

Figure 5:
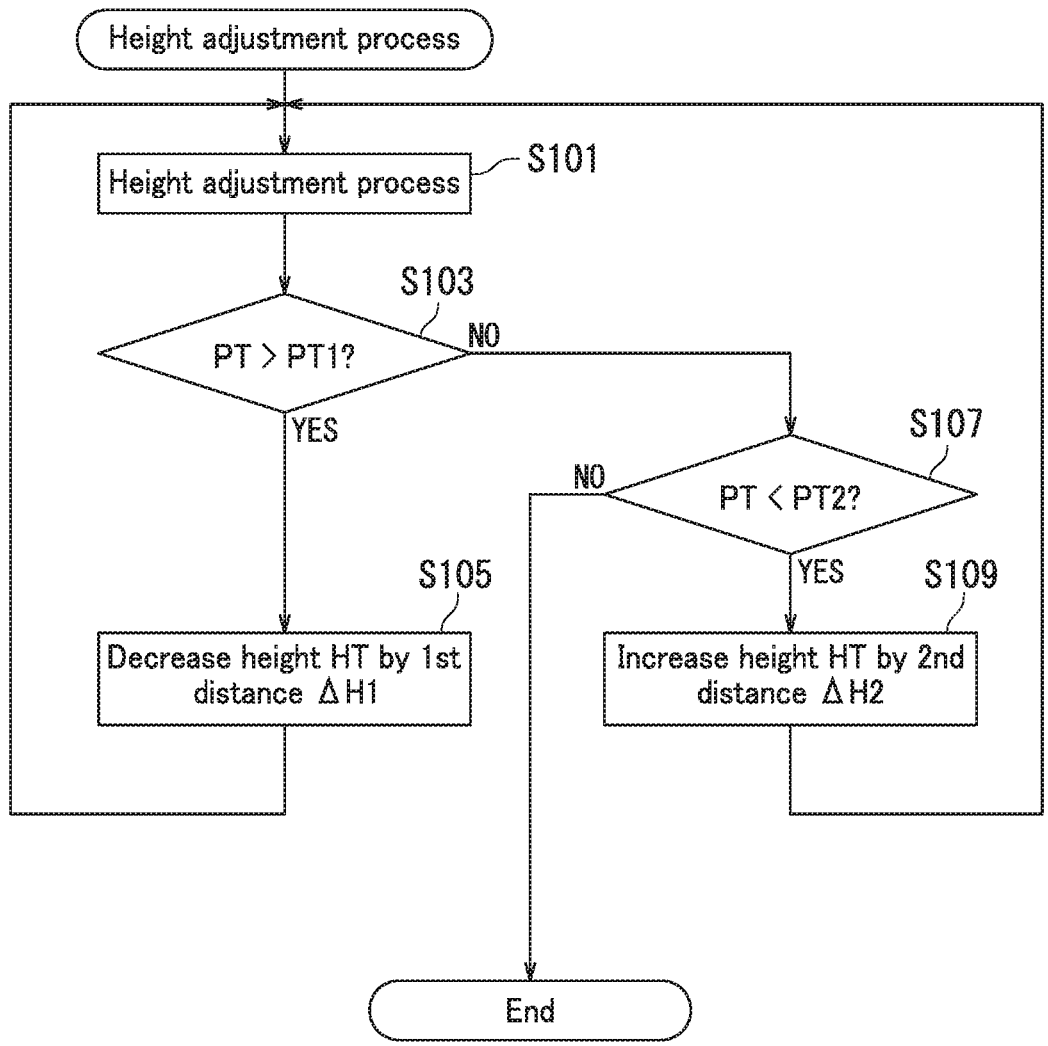
FIG. 5 is a flowchart illustrating a height adjustment process of the controller.

Next, the process of the controller 5 will be described with reference to FIGS. 2, 5, and 6. FIG. 5 is a flowchart illustrating a "height adjustment process" of the controller 5. The height adjustment process adjusts the height HT of the touch panel 41.

In Step S101 as illustrated in FIG. 5, the first detection section 511 first detects the total pressure PT in the contact area.

Next, in Step S103, the first instruction section 521 determines whether or not the total pressure PT is higher than the first pressure PT1.

The process advances to Step S107 when the first instruction section 521 has determined that the total pressure PT is not higher than the first pressure PT1 (NO in Step S103). When the first instruction section 521 has determined that the total pressure PT is higher than the first pressure PT1 by contrast (YES in Step S103), the process advances to Step S105.

In Step S105, the first instruction section 521 then instructs the height adjuster 6 to decrease the height HT by the first distance ΔH1, and the process returns to Step S101.

When NO in Step S103, the first instruction section 521 determines whether or not the total pressure PT is lower than the second pressure PT2 in Step S107.

The process ends when the first instruction section 521 has determined that the total pressure PT is not lower than the second pressure PT2 (NO in Step S107). When the first instruction section 521 has determined that the total pressure PT is lower than the second pressure PT2 by contrast (YES in Step S107), the process advances to Step S109.

In Step S109, the first instruction section 521 then instructs the height adjuster 6 to increase the height HT by the second distance ΔH2, and the process returns to Step S101.

Figure 6:
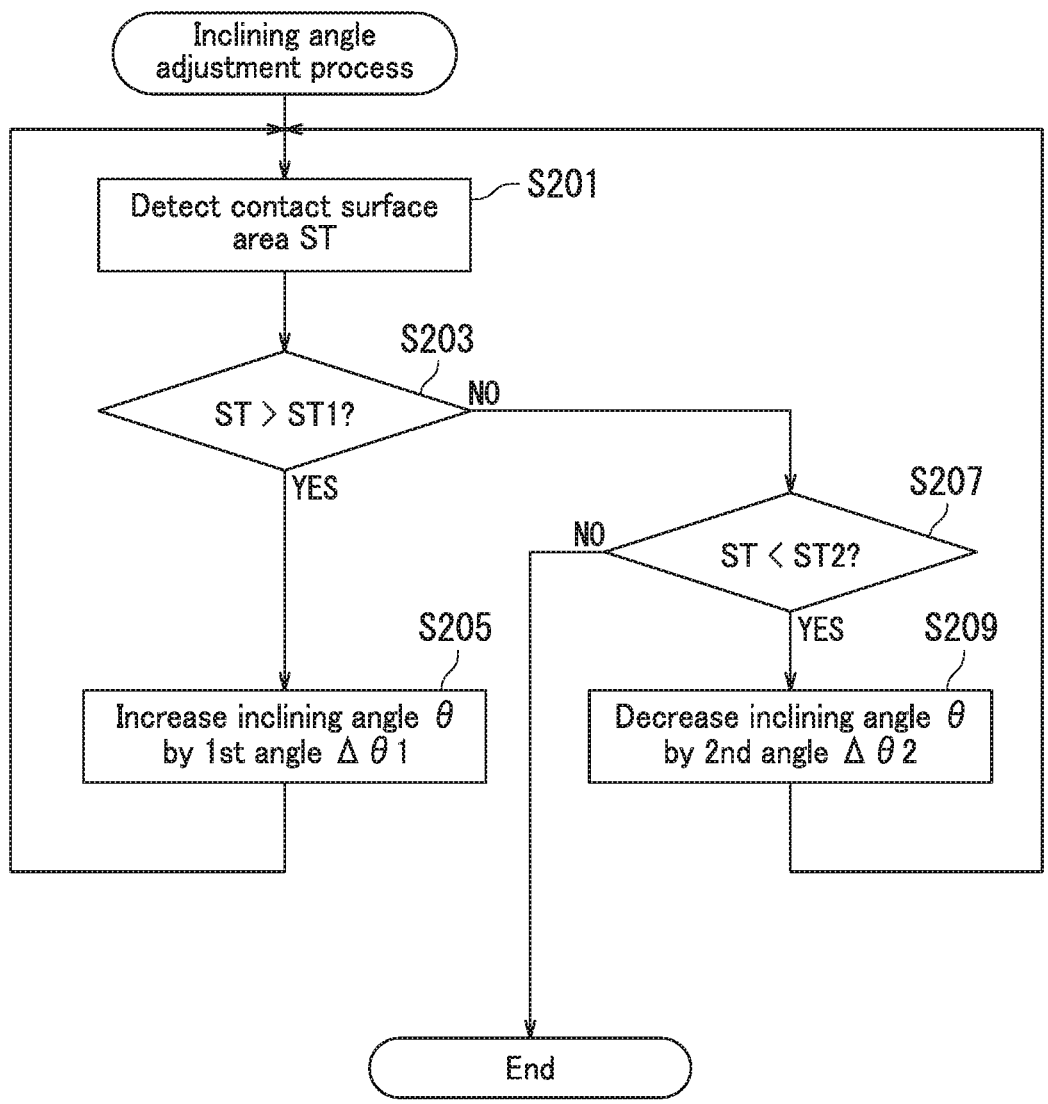
FIG. 6 is a flowchart illustrating an inclining angle adjustment process of the controller.

FIG. 6 is a flowchart illustrating an "inclining angle adjustment process" of the controller 5. The inclining angle adjustment process adjusts the inclining angle θ of the touch panel 41.

In Step S201 as illustrated in FIG. 6, the second detection section 512 first detects the surface area ST of the contact area.

Next, in Step S203, the second instruction section 522 determines whether or not the surface area ST is larger than the first surface area ST1.

The process advances to Step S207 when the second instruction section 522 has determined that the surface area ST is not larger than the first surface area ST1 (NO in Step S203). When the second instruction section 522 has determined that the surface area ST is larger than the first surface area ST1 by contrast (YES in Step S203), the process advances to Step S205.

In Step S205, the second instruction section 522 then instructs the inclining angle adjuster 7 to increase the inclining angle θ by the first angle θΔ1, and the process returns to Step S201.

When NO in Step S203, the second instruction section 522 determines whether or not the surface area ST is smaller than the second surface area ST2 in Step S207.

The process ends when the second instruction section 522 has determined that the surface area ST is not smaller than the second surface area ST2 (NO in Step S207). When the second instruction section 522 has determined that the surface area ST is smaller than the second surface area ST2 by contrast (YES in Step S207), the process advances to Step S209.

In Step S209, the second instruction section 522 then instructs the inclining angle adjuster 7 to decrease the inclining angle θ by the second angle θΔ2, and the process returns to Step S201.

As described above with reference to FIGS. 2, 5, and 6, the controller 5 can adjust the height HT of the touch panel 41 so that the total pressure PT is at least the second pressure PT2 and at most the first pressure PT1. The controller 5 can also adjust the inclining angle θ of the touch panel 41 so that the surface area ST is at least the second surface area ST2 and at most the first surface area ST1.

Figure 7:
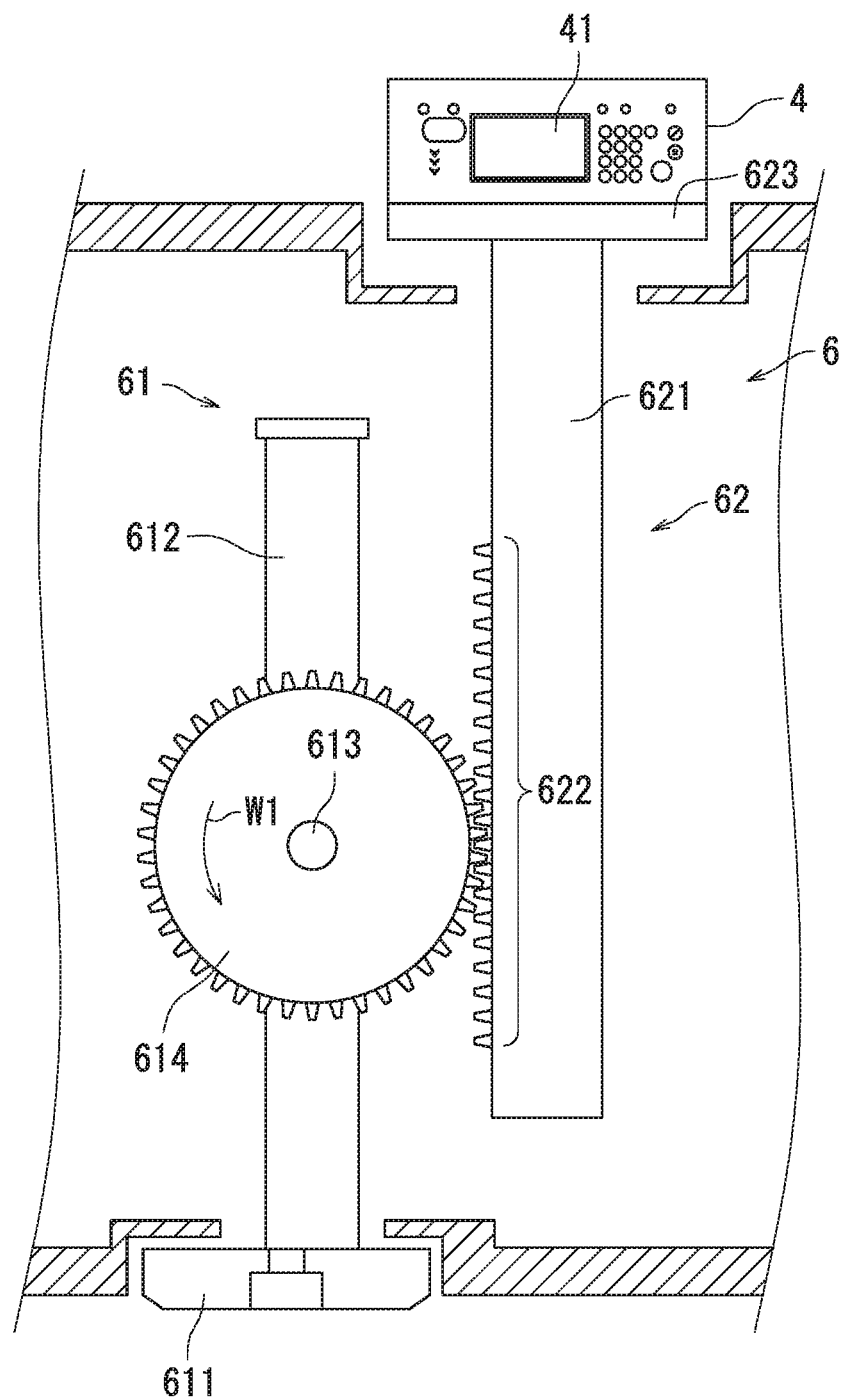
FIG. 7 is a diagram illustrating a configuration of a height adjuster according to the present embodiment.

Next, a configuration of the height adjuster 6 according to the present embodiment will be described with reference to FIG. 7. FIG. 7 is a diagram illustrating the configuration of the height adjuster 6. As illustrated in FIG. 7, the height adjuster 6 includes a drive section 61 and a movable section 62. The drive section 61 drives the movable section 62 in an up-and-down direction. The movable section 62 is driven to ascend and descend by the drive section 61.

The drive section 61 includes a support section 611, a column 612, and a circular gear 614. The support section 611 is fixed to a lower end of the column 612 and supports the column 612. The column 612 is a column-shaped member and supports the circular gear 614. The circular gear 614 is rotatable around a shaft 613. The circular gear 614 is driven by an unillustrated motor.

The movable section 62 includes an ascending and descending member 621, a linear gear 622, and a support member 623. The ascending and descending member 621 is supported so as to freely ascend and descend by an unillustrated guide. The linear gear 622 is formed in a belt shape on a side of the ascending and descending member 621 facing the column 612, and engages with the circular gear 614. The linear gear 622 and the circular gear 614 forms a so-called "rack and pinion". The support member 623 is disposed on the top of the ascending and descending member 621, and supports the operation display section 4.

Next, the operation of the height adjuster 6 will be described. The circular gear 614 is driven to rotate in a direction W1 by the motor. The linear gear 622 is moved upward by the circular gear 614. The ascending and descending member 621 and the support member 623 then move upward as one with the linear gear 622. As a result, the operation display section 4 can be moved upward. That is, the height HT of the touch panel 41 can be increased. The height HT of the touch panel 41 can be decreased by driving the circular gear 614 to rotate in a direction opposite to the direction W1. Thus, the height adjuster 6 can adjust the height HT of the touch panel 41.

Figure 8A:
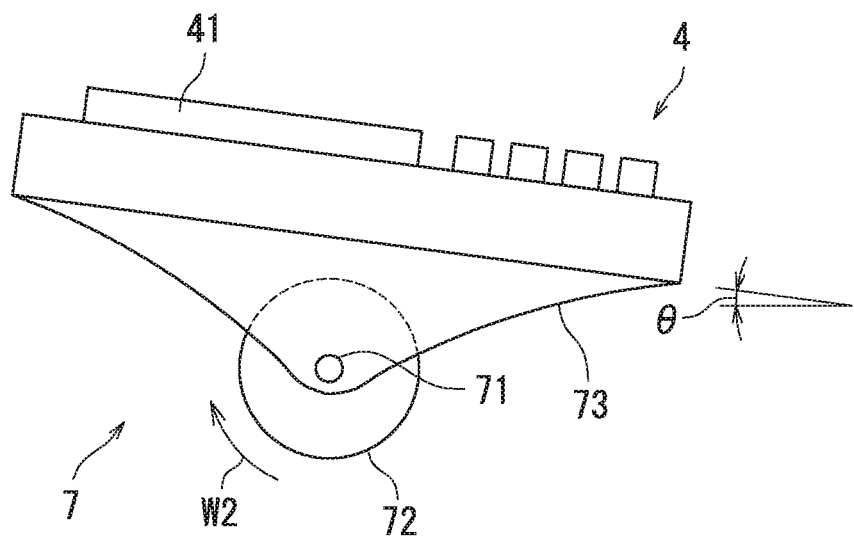
FIGS. 8A and 8B are side views illustrating a configuration of an inclining angle adjuster according to the present embodiment.
Figure 8B:
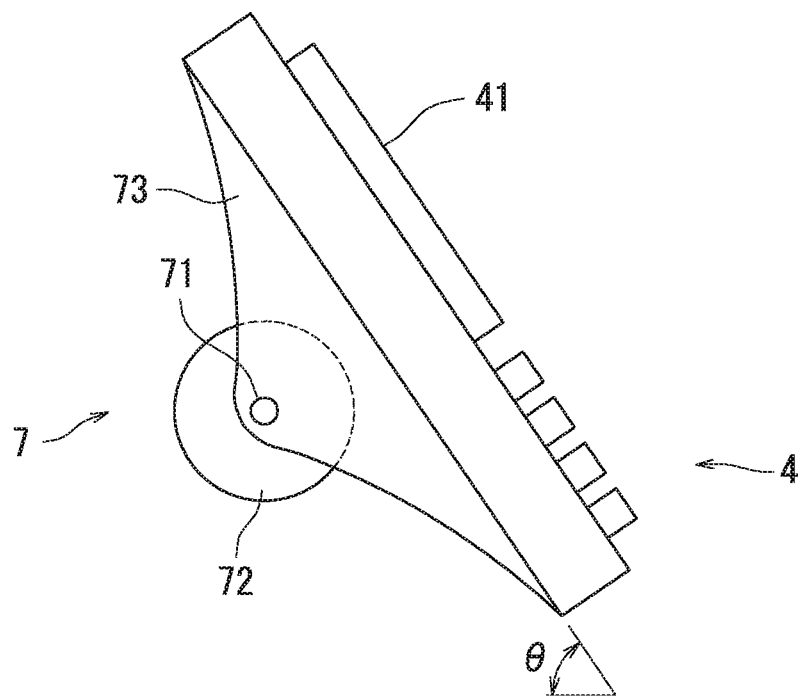

Next, a configuration of the inclining angle adjuster 7 according to the present embodiment will be described with reference to FIGS. 8A and 8B. FIGS. 8A and 8B are side views illustrating the configuration of the inclining angle adjuster 7. FIG. 8A is a diagram illustrating an example of the touch panel 41 in a state in which the inclining angle θ is small. FIG. 8B is a diagram illustrating an example of the touch panel 41 in a state in which the inclining angle θ is large. As illustrated in FIG. 8A, the inclining angle adjuster 7 includes an axle member 71, a disc-shaped member 72, and a support member 73.

The support member 73 supports the operation display section 4. The support member 73 spans both ends of the operation display section 4 in a longitudinal direction. The disc-shaped member 72 is disposed in a position facing the both ends of the operation display section 4 in the longitudinal direction. The longitudinal direction of the operation display section 4 is perpendicular to the plane of FIGS. 8A and 8B. The disc-shaped member 72 is fixed to the support member 73. The disc-shaped member 72 is rotatably supported by the axle member 71.

The operation of the inclining angle adjuster 7 will be described as follows. The disc-shaped member 72 is driven to rotate around the axle member 71 by an unillustrated motor. The inclining angle θ increases when the disc-shaped member 72 rotates in a direction W2. The inclining angle θ is 15° in FIG. 8A. The inclining angle θ is 45° in FIG. 8B. The state illustrated in FIG. 8A can be altered to the state illustrated in FIG. 8B by the rotation of the disc-shaped member 72 in the direction W2. The inclining angle θ decreases when the disc-shaped member 72 is driven to rotate in a direction opposite to the direction W2. Therefore, the state illustrated in FIG. 8B can be altered to the state illustrated in FIG. 8A by the rotation of the disc-shaped member 72 in the opposite direction of the direction W2. Thus, the inclining angle adjuster 7 can adjust the inclining angle θ of the touch panel 41.

An embodiment of the present disclosure is described above with reference to the drawings. However, the present disclosure is not limited to the above embodiment, and may be implemented in various manners within a scope not departing from the gist thereof (as described below in (1) to (3), for example). The drawings illustrate the main constituent elements schematically for ease of understanding, and the aspects of the main constituent elements such as thicknesses, lengths, and numbers thereof may differ in practice out of convenience for the preparation of the drawings. Also, the shapes, dimensions, and the like of the constituent elements illustrated in the above embodiment are but one example, not particularly limited, and may be implemented in various manners within a scope not substantially departing from the configuration of the present disclosure.

(1) As described with reference to FIG. 1, the touch panel 41 is a portion of the operation display section 4. However, the present disclosure is not limited hereto. The touch panel 41 need only be disposed on the image forming apparatus 100. For example, the touch panel 41 may be a separate section from an operation section having hard keys.

(2) As described with reference to FIG. 2, the user maintains a state in which a finger is in contact with the touch panel 41 until the process in which the adjuster 600 adjusts the condition of disposition of the touch panel 41 has completed. However, the present disclosure is not limited hereto. The user need only make contact with the touch panel 41. For example, the user may intermittently make contact with the touch panel 41. In such a configuration, the adjustment instruction section 52 instructs the adjuster 600 to adjust the condition of disposition of the touch panel 41 when the user has made contact with the touch panel 41.

(3) As described with reference to FIGS. 8A and 8B, the direction of the display surface of the touch panel 41 is rotatable around the axle member 71. However, the present disclosure is not limited hereto. The direction of the display surface of the touch panel 41 may be rotatable in a left-right direction of the user (around an axis perpendicular to the axle member 71). The direction of the display surface of the touch panel 41 indicates a direction perpendicular to the display surface of the touch panel 41. In such a configuration, an inclining angle φ of the touch panel 41 indicates the direction of the display surface of the touch panel 41.

Also in this configuration, the inclining angle φ of the touch panel 41 is adjusted based on the pressure distribution in the contact area. The contact area indicates an area in which the user makes contact with the touch panel 41. Specifically, the pressure in the contact area is detected with respect to areas therein on the right and left sides as viewed by the user. The inclining angle φ of the touch panel 41 is then adjusted in a direction in which the right side of the touch panel 41 as viewed by the user moves away from the user, when the pressure on the area on the right side is higher than the pressure on the area on the left side. By contrast, the inclining angle φ of the touch panel 41 is adjusted in a direction in which the left side of the touch panel 41 as viewed by the user moves away from the user, when the pressure on the area on the left side is higher than the pressure on the area on the right side.

What is claimed is:

1. An image forming apparatus, comprising:
   a touch panel;
   an adjuster configured to adjust a position and an attitude of disposition of the touch panel;
   a detection section configured to detect a surface area of a contact area and a total pressure in the contact area in which a user makes contact with the touch panel, and
   an adjustment instruction section configured to instruct the adjuster to adjust at least one of the position and the attitude of the touch panel based on the surface area and the total pressure, wherein
   the adjuster adjusts an inclining angle of the touch panel with respect to a horizontal plane and adjusts a height of the touch panel,
   the adjustment instruction section is stored on a computer-readable storage medium,
   the adjustment instruction section instructs the adjuster to increase the inclining angle by a first angle when the surface area is larger than a first surface area,
   the adjustment instruction section instructs the adjuster to decrease the inclining angle by a second angle when the surface area is smaller than the second surface area,
   the adjustment instruction section instructs the adjuster to decrease the height by a first distance when the total pressure is higher than the first pressure, and
   the adjustment instruction section instructs the adjuster to increase the height by a second distance when the total pressure is lower than the second pressure.

2. The image forming apparatus according to claim 1, wherein
   the detection section detects a pressure distribution in the contact area,
   the adjuster adjusts a direction of a display surface of the touch panel,
   the adjustment instruction section instructs the adjuster to adjust the direction of the display surface based on the detection result of the detection section, and
   the direction of the display surface indicates a direction perpendicular to the display surface of the touch panel.

3. The image forming apparatus according to claim 2, wherein
   when there is an area in which pressure is high and an area in which the pressure is low based on the pressure distribution, the adjustment instruction section instructs the adjuster to adjust the direction of the display surface of the touch panel such that the area in which the pressure is high moves in a direction away from the user.

* * * * *